July 2, 1946.　　　　D. C. BENTON　　　　2,403,330

BLIND FASTENING BOLT AND NUT

Filed Jan. 22, 1944

INVENTOR.
Dudley C. Benton
BY
A.B.Bowman
Attorney

Patented July 2, 1946

2,403,330

UNITED STATES PATENT OFFICE 2,403,330

BLIND FASTENING BOLT AND NUT

Dudley C. Benton, San Diego, Calif., assignor and by decree of court of one-half to Marie E. Warren, San Diego, Calif.

Application January 22, 1944, Serial No. 519,260

3 Claims. (Cl. 85—2.4)

My invention relates to a bolt and nut which is arranged to be secured in position from one side of the objects to be connected together, and the objects of my invention are:

First, to provide a bolt and nut which may be readily positioned and secured in objects to be secured together operable from one side only in which the head rests against one side and a portion of the nut rests against the opposite side when tightened;

Second, to provide a bolt and nut of this class in which a portion of the nut is distorted so that it rests against a sleeve surrounding the bolt and also against a portion of the object to be secured;

Third, to provide a bolt and nut of this class which provides a substantial large surface engagement of the nut with the object to be secured on the opposite side from the head of the bolt;

Fourth, to provide a bolt and nut of this class in which the nut is rigidly secured and locked against turning on the bolt when secured in operative position; and Fifth, to provide a bolt and nut of this class which is very simple and economical of construction, easy to install from one side of the object to be secured, efficient, and durable.

Figure 1:
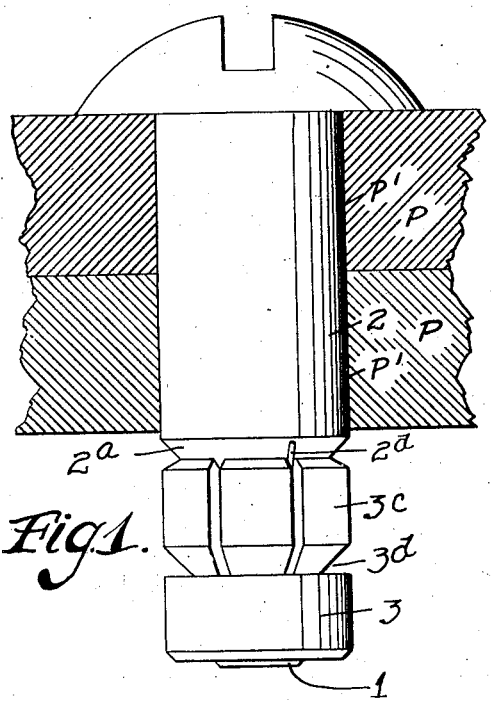
Figure 2:
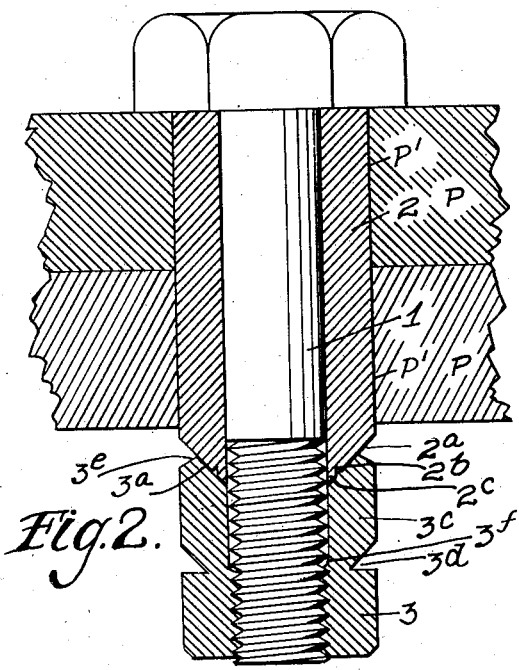
Figure 3:
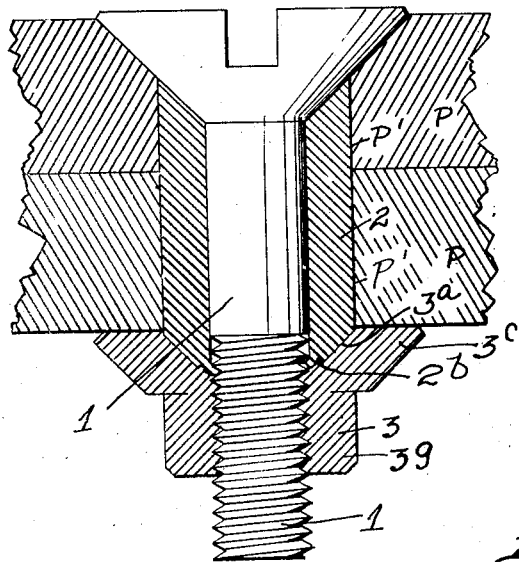
Figure 4:
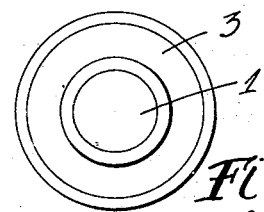
Figure 5:
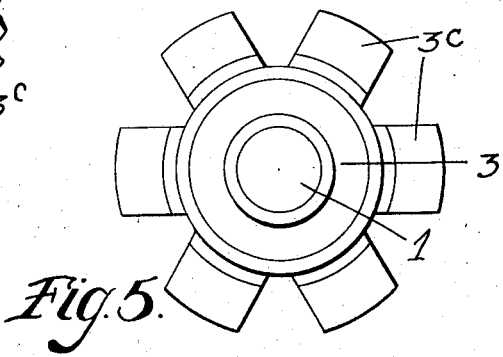

With these and other objects in view as will appear hereinafter, my invention consists of certain novel features of construction, combination and arrangement of parts and portions as will be hereinafter described in detail and particularly set forth in the appended claims, reference being had to the accompanying drawing, and to the characters of reference thereon which form a part of this application in which:

Figure 1 is a side elevational view of my bolt and nut before the nut is tightened into position against the object to be secured showing a slotted headed bolt; Fig. 2 is a sectional view of the same showing a hexagon shaped headed bolt; Fig. 3 is another sectional view showing the nut in secured relation with the object to be secured and with the bolt and showing a countersunk headed bolt; Fig. 4 is an end view of the bolt and nut shown in Fig. 2; and Fig. 5 is an end view of the bolt and nut as shown in Fig. 3.

Similar characters of reference refer to similar parts and portions throughout the several views of the drawing.

The bolt 1, sleeve 2 and nut 3 constitute the principal parts of my blind fastening bolt and nut.

The bolt 1 may be any conventional bolt threaded at one end and with any type of conventional head at its opposite end, as shown in Figs. 1, 2 and 3 of the drawing. The holes P¹ in the plates P are made enough larger than the bolt body to receive the sleeve 2. The outer edge of these sleeves 2 are flat and straight, as shown in Fig. 2 of the drawing for the type of bolt head shown in Figs. 1 and 2, while the sleeve 2e shown in connection with the countersunk head is tapered at its outer end conforming to the head of the bolt, as shown best in Fig. 3 of the drawing. The inner end of the sleeve used in connection with all of the types of bolt heads is the same. It is provided with an inwardly and downwardly tapered edge 2a and with a small weakening notch 2b near its inner side. It is arranged to fit the body of the bolt, but permits free movement of the bolt therein. Screw-threaded on the threaded end of the bolt 1 is the nut 3 which is provided with a tapered portion 3a conforming to the tapered portion 2a of the sleeve member 2, as shown best in Fig. 2 of the drawing. The outer portion 3c of the nut 3 is divided into a plurality of sections. In this case I have shown six forming a sectional apron which is arranged to be spread when the bolt 1 is turned into the nut 3 by the bevelled portion 2a engaging the bevelled portion 3a, the portion 3c before being spread being provided with a bore large enough to clear the outer edges of the thread of the bolt 1, thus providing surfaces for engaging the bevelled portions 3a, as shown best in Fig. 3 of the drawing, when the members forming the portion 3c are spread, as shown in Fig. 3. In order to facilitate the spreading of the portion 3c there is provided an annular groove 3d intermediate the ends of the nut. This nut is also provided with a bevelled outer edge 3e to facilitate the spreading of the portion 3c. This nut 3 is provided with a beveled annular shoulder portion 3f upon its inner side which is adapted to engage the fin edge 2c and turn it into tight interlocked engagement with the threads of the bolt 1 when the bolt is secured tightly into the nut with the portion 3c spread, as shown in Fig. 3 of the drawing, thus securely locking the nut, sleeve and bolt rigidly together. The extended portion 3g of the nut 3 is threaded internally to engage the threads of the bolt 1.

It is preferred to provide the sleeve 2 with lug portions 2d which are arranged to enter the slot between the members of the portion 3c, shown best in Fig. 1 of the drawing, to prevent the distortional movement of the nut 3 relatively to the sleeve 2 when the bolt 1 is being turned into the nut 3.

The operation of my blind fastening bolt and nut is substantially as follows: The sleeve and nut are placed upon the bolt in a position substantially as shown in Figs. 1 and 2 of the drawing. Then the assembled unit is placed in position in the openings P¹ in the plates P. The sleeve 2 is enlarged slightly at its outer end so that it provides a substantially tight fit at its outer end in the outer plate P. Then the head of the bolt 1 is turned which causes the bevelled portion 3a of the nut 3 to ride upon the bevelled portion 2a of the sleeve 2, thus spreading the sections of the portion 3c and gradually closing the annular slot 3d. As soon as the bevelled portion 3a reaches the surface of the plate P it rides upon the surface of the plate. Just at the time when this portion 3c reaches the position as shown in Fig. 3 of the drawing, the curved portion 3f engages the fin portion 2c of the sleeve 2 and and crimps it in against and into the threads of the bolt 1, thus providing a relatively broad flat surface of the nut against the plate P at the one side, the bolt head at the opposite side and the slot 3d is closed forming a rigid support for the portion 3c at the same time the sleeve 2 is locked in engagement with the threads of the bolt.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a blind fastening bolt and nut of the class described, the combination of a bolt provided with a head at one end and threaded at its opposite end, a sleeve mounted on the body of said bolt with one end adapted to engage the head and its opposite end provided with a bevelled edge with its longer side toward said bolt, and a nut provided with an apron slotted to provide a plurality of sections with a bevelled edging adapted to conform to the bevelled edge on said sleeve and provided with threads at its inner end adapted to fit the threads on said bolt, said nut provided with an external annular groove intermediate its ends adjacent to the inner end of said threads on said nut forming a weakened portion between said nut and said apron, said sleeve provided with a weakened portion close to its inner extremity.

2. In a blind fastening bolt and nut of the class described, the combination of a bolt provided with a head at one end and threaded at its opposite end, a sleeve mounted on the body of said bolt with one end adapted to engage the head and its opposite end provided with a bevelled edge with its longer side toward said bolt, and a nut provided with an apron slotted to provide a plurality of sections with a bevelled edging adapted to conform to the bevelled edge on said sleeve and provided with threads at its inner end adapted to fit the threads on said bolt, said nut provided with an external annular groove intermediate its ends adjacent to the inner end of said threads on said nut forming a weakened portion between said nut and said apron, the beveled end of said sleeve provided with a weakened portion close to its extremity, said nut provided with an inner annular shouldered portion adjacent the threaded portion thereof adapted to engage the weakened portion of said sleeve whereby said sleeve is interlocked with said bolt.

3. In a blind fastening bolt and nut of the class described, the combination with a threaded bolt, of a sleeve provided with a bevelled edge arranged to fit on said bolt and extend some distance over the threaded portion of said bolt, a nut provided with a slotted apron provided with a bevelled edge adapted to engage the bevelled edge on said sleeve, the bevel on said sleeve terminating in a fin edge adapted to be forced into the threads on said bolt with the turning of the bolt into said nut.

DUDLEY C. BENTON.